May 9, 1967 R. E. NORWOOD 3,318,329
FLUID-OPERATED LOGIC DEVICES
Filed July 24, 1964

INVENTOR
RICHARD E. NORWOOD
BY *K. P. Johnson*
ATTORNEY

United States Patent Office 3,318,329
Patented May 9, 1967

3,318,329
FLUID-OPERATED LOGIC DEVICES
Richard E. Norwood, Endicott, N.Y., assignor to International Business Machines Corporation, New York, N.Y., a corporation of New York
Filed July 24, 1964, Ser. No. 384,921
10 Claims. (Cl. 137—599)

This invention relates generally to fluid-controlled valves and more particularly to such valves using a flexible diaphragm for controlling fluid flow therein.

Many devices have been devised by which the pressure and flow of fluid can be controlled to operate valves and indicating apparatus. These devices are generally required to perform amplification and switching of fluid control signals and provide output signals of sufficient pressure to perform a function at its subsequent stage. The prior fluid control devices include those of the fluid amplifier type and the type in which a movable piston or vane is used to divert or stop fluid flow.

In a fluid amplifier device a low energy, low volume stream of fluid is directed against a high volume, high energy stream to divert the stream from one channel to another. There are no moving parts in such a device so that the operation is reliable and wear is negligible. However, each of these amplifiers requires a relatively large volume of supply fluid since the flow of the main or power stream must be maintained constantly. When a large plurality of these devices are used in a servo or computer system, the supply volume of fluid becomes significant and requires an expensive, large capacity pump.

The control valves employing a movable spool or vane do not require a continuous flow of fluid, but since these valves utilize a movable member, they are subject to wear so that leakage increases with use. These valves have the further disadvantage that there is a large mass or high friction to overcome in controlling the spool so that the operation of the valve is slowed.

Accordingly, it is an object of this invention to provide fluid control apparatus employing a flexible diaphragm interposed between a pair of flow restrictions for producing signal amplification or inversion.

Another object of this invention is to provide fluid control devices employing a diaphragm and flow restrictions in which a positive fluid output signal is produced in response to the presence or absence of a control signal.

Yet another object of this invention is to provide a fluid control device having controlled leakage that responds readily to an input control signal.

Still another object of this invention is to provide a plurality of configurations and arrangements for fluid logic devices employing flexible diaphragms therein.

Another object of this invention is to provide fluid control apparatus of simple design which is easy and inexpensive to manufacture and maintain.

In accordance with the foregoing objects, the invention provides a flow path with inlet and outlet channels and chamber therebetween for pressurized fluid and also a control channel for admitting fluid control pulses to the chamber. A flexible, elastic diaphragm is positioned in the chamber and is normally displaced by the pressurized fluid to permit flow from the inlet passage to the outlet passage. However, the pressurized fluid is prevented from reaching the control channel by the diaphragm. Upon supplying a control signal at the control channel, the diaphragm can be displaced to overcome the fluid pressure in the flow path and close against a ridge and thereby block flow from the input channel to the output channel. There are also provided in each of the input and output channels flow restrictions by which the pressure between the inlet and outlet channels can be regulated. The output signal from the device can be taken from either the input or output channels and used as a control pulse for other stages of the fluid system.

By appropriately determining the size of the restriction in the inlet and outlet channels, the desired ratio of pressures between the control pressure and inlet pressure can be achieved so that the device can be used to function as an amplifier; that is, the control pressure need be only a fraction of the supply pressure and the output signal from the diaphragm valve. The location of the ridge with which the diaphragm comes in contact may likewise be selected to provide relative areas so the diaphragm will switch at the desired pressures. The diaphragm logic device has the advantage of being easy to manufacture in any of a wide range of sizes so that the desired volume of fluid flow may be obtained. The diaphragm devices have the inherent advantages of low noise and power consumption because of restricted flow and devices can be added or omitted without serious effect on the fluid supply.

The foregoing and other objects, features and advantages of the invention will be apparent from the following more particular description of preferred embodiments of the invention, as illustrated in the accompanying drawings wherein.

Figure 1:
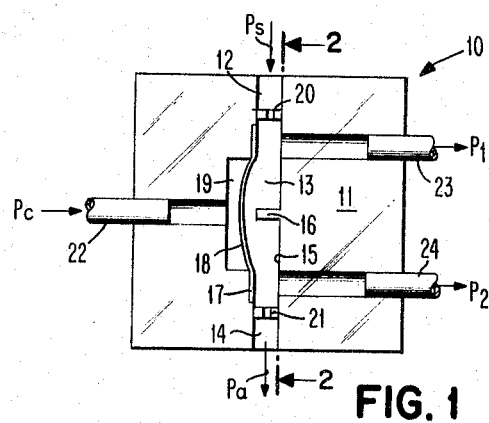
FIGURE 1 is a plan view of the basic diaphragm element of the invention.
Figure 2:
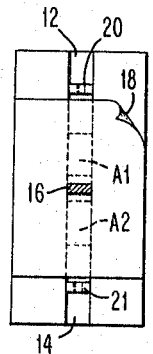
FIGURE 2 is a sectional view of the element shown in FIG. 1 and taken along the lines 2—2 thereof.

Referring to FIGS. 1 and 2, there is shown the basic element of the invention from which various logic control devices can be assembled. The device 10 comprises a laminar block 11 of imperforate material, such as a plastic or metal, having an entry flow path 12 leading to a chamber 13 that is provided with an exit flow path 14 therefrom. Extending from wall 15 to the chamber is a ridge 16 and secured to the opposite wall 17 is a thin, flexible diaphragm 18 of an elastic material such as rubber which forms a control compartment 19. The flow path is also formed with a restriction or flow resistance 20, which can be a blocking plate having a hole therein, in the input path 12 and a similar flow restriction 21 in the exit flow path 14. The hole size enables the chamber pressure to be regulated as desired. Communicating with compartment 19 is control channel 22 to which control fluid pressure pulses $P_c$ may be directed.

Two output channels 23 and 24 are provided by which output signals may be obtained in response to the input signals applied at control channel 22. The fluid pressure in channel 23 is normally at the lower of two levels therein and the fluid at channel 24 is at the higher of two levels when no control signals appear in control channel 22. In this instance fluid from a suitable pressure-regulated supply $P_s$ flows through restriction 20, around ridge 16 by deflecting diaphragm 18, and out through exit restriction 21 to atmosphere or a suitable pressure sink $P_a$.

The fluid pressure $P_1$ or $P_2$ in either of the respective output channels 23 or 24 is of substantially the same pressure. However, when a pressure signal appears in channel 22 which is sufficient to seal diaphragm 18 against ridge 16, output channel 24 is effectively cut off from the supply pressure and thus its pressure will drop substantially instantly to atmospheric. However, the pressure in output channel 23 will rise to that approximately equal to the supply pressure.

The diaphragm valve of device 10 does not require a high volume of fluid because of the resistances 20 and 21 which tend to limit flow when the device is open. Fluid, of course, does not pass to the atmosphere through exit channel 14 when the diaphragm is closed. In the instances when the output channels 23 or 24 serve as control ducts in subsequent devices, there is usually no fluid flow in those channels because they are terminated in respective diaphragm chambers where only the pressure of the output signals is indicative of the signal transmitted.

It will be evident that both output channels of the device 10 may be used together or only channel 23 or 24 can be used separately, depending upon the desired function to be attained. For example, the output from channel 24 is the inverse of the control pressure so that the invert function can be achieved. In this instance, assuming that channel 23 is blocked or eliminated, flow occurs from the supply pump through resistance 20, through the diaphragm chamber and out fluid resistance 21. The diaphragm 18 presents no impedance to fluid flow since it is open. If the diaphragm tension is assumed to be negligible in the deflected position, as by preforming the diaphragm, and that the fluid resistances 20 and 21 have been set so that pressure at $P_2$ is a fraction such as 70% of the supply pressure, then the total force urging the diaphragm open is the pressure $P_2$ times the areas $A_1$ plus $A_2$ (FIG. 2). As the control pressure $P_c$ is increased, it will have no effect until the control pressure times the area of the diaphragm exposed in compartment 19 equals the pressure $P_2$ times the area of the diaphragm. As soon as the control pressure exceeds the ratio of 0.7 times the supply pressure, the diaphragm snaps over against ridge 16. The force counteracting the control pressure is only the area $A_1$ multiplied by the supply $P_s$ at that time.

When control pressure $P_c$ is reduced, the diaphragm will remain closed until it reaches such value that the area $A_1$ times the supply pressure $P_s$ exceeds the control pressure times the entire area $A_1$ plus $A_2$ of the diaphragm. It can be seen that when the control pressure $P_c$ closes off chamber 13, the output pressure $P_2$ at channel 24 goes to atmospheric pressure $P_a$. Thus the device may be used to perform the inversion function of input control signals.

When it is desired to use device 10 as an amplifier, output channel 24 may be eliminated or disregarded and channel 23 used to provide the output signal in which the fluid pressure is $P_1$. In this instance, the output pressure $P_1$ is preset by the fluid impedances 20 and 21 so that the output pressure is approximately 0.2 of the supply pressure $P_s$. As the control pressure $P_c$ is increased, the output pressure $P_1$ acting on area $A_1$ will increase while the pressure acting on area $A_2$ will decrease. The output pressure will vary so as to keep the total force on the diaphragm at zero if we again assume there is no diaphragm tension. When the control pressure $P_c$ becomes greater than one-half the supply pressure $P_s$, the diaphragm will seal off the flow. The output pressure $P_1$ will thus be at the pressure of the supply which is acting on only one-half the area of the diaphragm while the input control signal $P_c$ is at a pressure only half that of the supply. When the device 10 is used as an amplifier, it is desirable that the downstream impedance or fluid restriction 21 be kept low relative to the upstream impedance 20, preferably in a ratio of a tenth of the upstream impedance.

Figure 3:
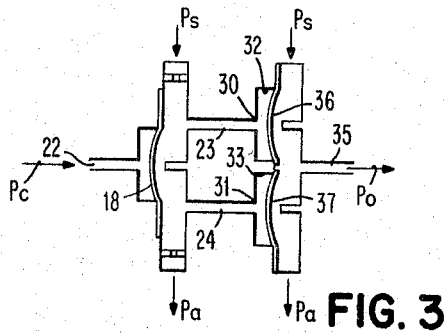
FIGURE 3 is a plan view of a two stage arrangement of the devices of the invention in which positive output control signals are provided for the fluid supply in response to either the presence or absence of a control signal.

Diaphragm device 10, as illustrated in FIGS. 1 and 2, is readily adaptable for positively controlling the transfer of power in another stage of diaphragm devices as shown in FIG. 3. In this arrangement the two outputs 23 and 24 from device 10 are each connected to the control ports 30 and 31 of respective diaphragm elements 32 and 33. These elements are, in turn, connected together serially between a fluid supply of pressure $P_s$ and the atmosphere. No flow resistances are used in the parallel right-hand channel of this arrangement in order to deliver the maximum pressure as an output signal at junction 35 intermediate the two devices.

When a control pressure pulse at control channel 22 closes diaphragm 18, the pressure in channel 23 moves toward the supply pressure. The pressure is also effective at device 32 to start closing diaphragm 36. When diaphragm 18 does close, the pressure in channel 24 starts to decrease permitting diaphragm 37 of device 33 to open. For a brief time both diaphragms 36 and 37 are open producing pressure drop through the two serial devices. This loss of pressure is sufficient to permit the control pressure of channel 23 to close diaphragm 36 in device 32 and maintain it closed. The supply pressure from channel 23 which is approaching $P_s$ is effective over the entire surface of diaphragm 36 while the same pressure $P_s$ is effective on only half the area of the opposite side after fully closing. The output pressure signal at junction 35 thus falls to atmospheric.

When the control signal on channel 22 is removed, flow resumes through device 10 and the pressure in channel 24 increases which acts on diaphragm 37. The flow through device 10 permits diaphragm 36 in device 32 to open so that both devices 32 and 33 are open temporarily producing a pressure drop across the devices. As a result, the pressure in channel 24 is operable to close diaphragm 37. The supply pressure acts only on the upstream area of diaphragm 37 because there is no resistance in the exit channel. Thus all pressure drop occurs across the ridge in diaphragm 37. Thus, the pressure of output 35 increases to the supply pressure $P_s$. With device 10 connected in the manner described, one of diaphragm devices 32 or 33 is closed whether or not a signal is present at control channel 22.

Figure 4:
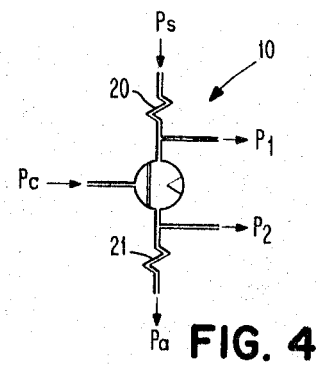
FIGURE 4 is a schematic diagram of the element shown in FIG. 3.
Figure 5:
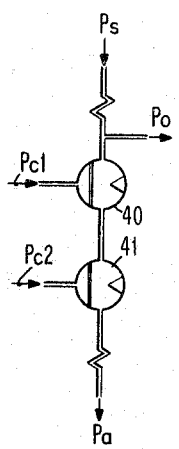
FIGURES 5 through 8 are schematic diagrams of the OR, NOR, AND and NAND logic blocks which can be constructed in accordance with the invention.
Figure 6:
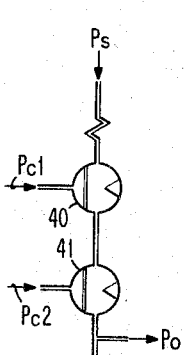

Various logic elements may be constructed by considering the principles discussed above. These elements are illustrated in FIGS. 4 through 8. FIG. 4 is merely a schematic representation of the device shown in FIG. 1 in which the electrical resistance symbol is used to represent fluid impedances 20, 21 and a circle with a horizontal input line denotes the diaphragm logic device and input control signal. The supply pressure is indicated by $P_s$ and the exhaust for atmospheric pressure is represented by $P_a$. This symbology is carried forward into the examples shown in FIGS. 5 through 8 in which the OR and NOR elements are shown in FIGS. 5 and 6, with the AND and NAND elements shown in FIGS. 7 and 8.

In the OR device of FIG. 5, a plurality of diaphragm devices 40 and 41 are connected serially between upstream and downstream fluid resistance. The output $P_o$ in this case is taken immediately after the upstream resistance so that the output signal will rise in pressure at any time one of the diaphragm devices receives a fluid signal of sufficient pressure to close off the stream flow from the supply to atmosphere. The output signal will rise in pressure at the same time the input control signal rises. The NOR device of FIG. 6 is similar to the OR device except that the output signal is taken between the last diaphragm device and the downstream fluid resistance element. At any time one of the intervening fluid diaphragm devices is cut off by a control signal the output pressure will go down to atmospheric pressure, thus providing an inverted signal compared to the input control signal.

Figure 7:
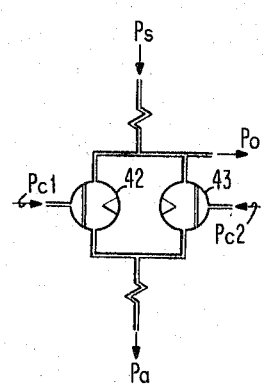
Figure 8:
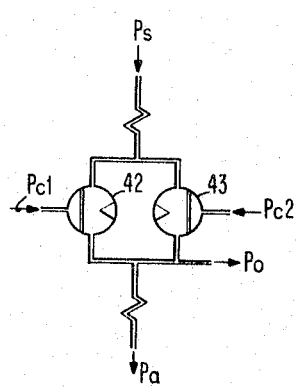

The AND device of FIG. 7 may incorporate multiple diaphragm devices 42 and 43 but these devices are connected in parallel between the upstream and downstream fluid resistance. In order to receive the positive-going or increasing output signal pressure, the output is taken intermediate the upstream fluid resistance and the diaphragm devices. No output signal will occur until all devices of the diaphragm units have received a control signal to block fluid flow therethrough at which time a positive-going output pressure signal will result. In the NAND device of FIG. 8 the diaphragm elements are arranged in a similar manner except that the output pressure signal is taken intermediate the parallel-connected diaphragm devices and the downstream impedance. An inverted output signal is provided when all diaphragm devices receive positive-going control pressure signals. It can be seen that each of the outputs of the logic devices can be connected to operate subsequent stages as desired. For example, the OR and NOR devices can be substituted for device 10 in FIG. 3 by the addition of another output channel.

These devices can, of course, be arranged in various combinations to provide the response desired upon the occurrence of specified conditions. Since the diaphragm devices do not require a large supply of fluid because of the reliance on pressure changes and restricted flow, many devices may be added to enlarge the capacity of the control system without requiring a larger capacity supply.

It is to be noted that while the diaphragm devices have been illustrated as constructed of rectangular chambers, they may also be constructed with concentric inlet and outlet channels separated by a common wall. The diaphragm would overlie the both channels in this instance and be engageable with the wall to control fluid flow from one to the other of the channels.

While the invention has been particularly shown and described with reference to preferred embodiments thereof, it will be understood by those skilled in the art that the foregoinng and other changes in form and details may be made therein without departing from the spirit and scope of the invention.

What is claimed is:

1. Fluid control apparatus comprising:
    means defining a flow path for pressurized fluid from an inlet to an outlet and including two spaced flow restrictors with a chamber and ridge therebetween;
    diaphragm means in said chamber movable by a fluid pressure signal against said ridge for terminating flow through said chamber; and
    means forming an outlet channel connected to said flow path between said restrictors for providing fluid from said path at a pressure indicative of the presence of said fluid pressure signal.

2. Fluid control apparatus comprising:
    means defining a flow path for fluid from a high pressure inlet port to a low pressure outlet port and including two flow restrictors and a chamber therebetween, said chamber having ridge fixed therein;
    a flexible member in said chamber forming a control compartment therein adjacent said ridge and movable into contact with said ridge for blocking said flow path in response to fluid pressure pulses;
    pulse channel means directing said pulses into said compartment for moving said member against said ridge to block said path; and
    output channel means forming a junction with said flow path intermediate one of said flow restrictors and said chamber ridge for providing a fluid signal of predetermined pressure in response to blocking said path.

3. Fluid control apparatus comprising:
    means defining a flow path for pressurized fluid from an inlet to an outlet port, said path including a first and second flow restrictor with a chamber and ridge intermediate thereof;
    displaceable diaphragm means operable by a fluid pressure pulse from a retracted position to a protracted position against said ridge for terminating flow through said chamber; and
    means forming an outlet channel connected to said flow path intermediate said first restrictor and said chamber for delivering an output signal of increased pressure when said flow is terminated in response to said pressure pulse.

4. Fluid control apparatus comprising:
    means defining a flow path for pressurized fluid from an inlet to an outlet port, said path including first and second flow restrictors and a chamber and ridge intermediate thereof;
    means in said chamber movable against said ridge in response to a fluid pressure pulse for terminating fluid flow through said chamber; and
    a pair of outlet channels each connected to said flow path between said ridge and one of said restrictors for providing output signals of opposite pressure change in response to said pulse.

5. Fluid control apparatus comprising:
    means forming a first flow path for pressurized fluid from an inlet to an outlet port, said path including first and second flow restrictors with a chamber and ridge intermediate thereof;
    means forming a second flow path for pressurized fluid from an inlet to an outlet with the path including a pair of chambers each with a ridge therein;
    a flexible diaphragm in each of said chambers movable against a respective ridge in response to applied fluid pressure for blocking flow through the chamber;
    a pair of control channels each joining at one end said first path between a different restrictor and the chamber ridge and connected at the opposite end to a different one of said chambers of said second path for applying fluid pressure to the diaphragm therein; and
    channel means for applying fluid pressure to move the diaphragm in the chamber of said first path; and
    an output port in said second path between said chambers therein for providing an output signal, whereby pressurized fluid flows from said output port only in the absence of fluid pressure applied to the diaphragm in said chamber of said first path.

6. Fluid control apparatus comprising:
    means defining a flow path for pressurized fluid from an inlet to an outlet port, said flow path including a pair of spaced flow restrictors with a plurality of chambers serially arranged in said path intermediate said restrictors, each said chamber having a ridge therein;
    a flexible diaphragm in each of said chambers movable against the ridge thereof for terminating flow therethrough in response to input fluid pressure signals applied thereto;
    input channel means at each said chamber for applying said input pressure signals against said diaphragms; and
    means forming an output channel connected to said flow path intermediate one of said restrictors and an adjacent chamber ridge for providing a change in the pressure of fluid in said output channel in response to the occurrence of a said input signal at one of said diaphragms.

7. Fluid control apparatus comprising:
    means defining a main flow path for pressurized fluid from an inlet to an outlet port, said main path including a pair of spaced flow restrictors with a main chamber and ridge therebetween;
    means forming an auxiliary flow path with an auxiliary chamber and ridge and connected to said main flow path intermediate said flow restrictors and in parallel with said main chamber in said main path;
    flexible diaphragm control means in each said main and auxiliary chamber movable against the respective ridge therein for blocking fluid flow through the chamber in response to input fluid pressure signals thereto; and
    means forming an outlet channel intermediate one of said restrictors and one of said chambers for providing an output fluid pressure signal when flow through both said chambers is coincidentally blocked by said input fluid pressure signals.

8. Fluid control apparatus comprising:
means defining a flow path for pressurized fluid from an inlet to an outlet and including therebetween at least one flow restrictor and a chamber having a ridge therein;
diaphragm means in said chamber movable by a fluid pressure signal against said ridge for terminating flow through said chamber; and
means forming an output channel connected to said flow path between said chamber and said restrictor for providing fluid from said path at a pressure indicative of the presence of said fluid pressure signal.

9. Fluid control apparatus comprising:
means defining a flow path for pressurized fluid from an inlet port to an outlet port, said flow path including at least one restrictor in series with a plurality of chambers serially arranged in said path between said restrictor and one of said ports, each said chamber having a ridge therein;
a flexible diaphragm in each of said chambers for terminating flow therethrough in response to input fluid pressure signals applied thereto;
input channel means at each said chamber for applying said input pressure signals against said diaphragms; and
means forming an output channel connected to said flow path intermediate said restrictor and the ridge in the adjacent one of said chambers for providing a change in the pressure of fluid in said output channel in response to the occurrence of a said input signal at one of said diaphragms.

10. Fluid control apparatus comprising:
means defining a main flow path for pressurized fluid from an inlet port to an outlet port and including therebetween in said main path at least one flow restrictor and main chamber with a ridge therein;
means forming an auxiliary flow path having an auxiliary chamber with ridge therein and connected to said main flow path between said restrictor and one said port so as to be in parallel with said main chamber;
flexible diaphragm control means in each said main and auxiliary chamber movable against the respective ridge therein for blocking fluid flow through the chamber in response to input fluid pressure signals supplied thereto; and
means forming an output channel intermediate said restrictor and one of said chambers for providing an output fluid pressure signal when flow through both said chambers is coincidentally blocked by said input fluid pressure signals.

References Cited by the Examiner

UNITED STATES PATENTS

| | | | |
|---|---|---|---|
| 3,151,623 | 10/1964 | Riordan | 137—118 X |
| 3,168,898 | 2/1965 | Samet | 137—81.5 X |

FOREIGN PATENTS

| | | |
|---|---|---|
| 1,329,720 | 5/1963 | France. |

M. CARY NELSON, *Primary Examiner.*

HENRY T. KLINKSIEK, *Examiner.*